US007471332B2

(12) United States Patent
Tohyama

(10) Patent No.: US 7,471,332 B2
(45) Date of Patent: Dec. 30, 2008

(54) IMAGING DEVICE HAVING A CAPABILITY OF CHECKING CONNECTION WITH A FLASH UNIT, FLASH UNIT HAVING A CAPABILITY OF CHECKING CONNECTION WITH AN IMAGING DEVICE, AND SYSTEM INCLUDING AN IMAGING DEVICE AND A FLASH UNIT AND HAVING A CAPABILITY OF CHECKING CONNECTION BETWEEN THE IMAGING DEVICE AND THE FLASH UNIT

(75) Inventor: Kei Tohyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 10/995,916

(22) Filed: Nov. 22, 2004

(65) Prior Publication Data

US 2005/0128829 A1 Jun. 16, 2005

(30) Foreign Application Priority Data

Dec. 11, 2003 (JP) ............................. 2003-412653

(51) Int. Cl.
*H04N 5/222* (2006.01)
*H04N 5/225* (2006.01)

(52) U.S. Cl. ...................................... 348/371; 348/374

(58) Field of Classification Search ................. 348/371, 348/374; 396/157, 176, 61, 180
See application file for complete search history.

(56) References Cited

U.S. PATENT DOCUMENTS

| 5,063,403 | A | * | 11/1991 | Yokonuma et al. | ........... 396/160 |
| 5,221,941 | A | * | 6/1993 | Matsui et al. | ............... 396/157 |
| 5,227,863 | A | * | 7/1993 | Bilbrey et al. | ................ 348/578 |
| 5,530,493 | A | * | 6/1996 | Suzuki | ........................ 351/206 |
| 6,349,175 | B1 | * | 2/2002 | Tokunaga | .................... 396/157 |
| 6,359,651 | B1 | * | 3/2002 | Yokonuma | ................... 348/370 |
| 6,571,061 | B2 | * | 5/2003 | Kawasaki et al. | ........... 396/156 |

FOREIGN PATENT DOCUMENTS

JP        2000-089328 A1      3/2000

\* cited by examiner

*Primary Examiner*—Luong T Nguyen
(74) *Attorney, Agent, or Firm*—Canon U.S.A. Inc., I.P. Division

(57) ABSTRACT

In a system including an imaging device and a flash unit, the imaging device includes an imaging device flash start command terminal adapted to output a flash start command signal to the flash unit, and an output unit adapted to output a terminal connection check signal to the flash unit via the imaging device flash start command terminal, and the flash unit includes a flash unit flash start command terminal adapted to receive the flash start command signal from the imaging device, a detection unit adapted to detect the terminal connection check signal received from the imaging device via the flash unit flash start command terminal, and a connection state evaluation unit adapted to evaluate a terminal connection state such that the connection state evaluation unit determines that the imaging device and the flash unit are connected to each other via the imaging device flash start command terminal and the flash unit flash start command terminal in a required connection state if the detection unit detects the terminal connection check signal.

5 Claims, 8 Drawing Sheets

IMAGING DEVICE HAVING A CAPABILITY OF CHECKING CONNECTION WITH A FLASH UNIT, FLASH UNIT HAVING A CAPABILITY OF CHECKING CONNECTION WITH AN IMAGING DEVICE, AND SYSTEM INCLUDING AN IMAGING DEVICE AND A FLASH UNIT AND HAVING A CAPABILITY OF CHECKING CONNECTION BETWEEN THE IMAGING DEVICE AND THE FLASH UNIT

BACKGROUND OF THE INVENTION

1. Field of the Invention

The present invention relates to a technique of checking whether a flash unit is connected to an imaging device such as a camera in a good state via a flash start command terminal via which a flash start command is transmitted between the imaging device and the flash unit.

2. Description of the Related Art

Japanese Patent Laid-Open No. 2000-89328 discloses a technique to check whether a flash unit is connected to an imaging device via connection terminals in a good state by performing a test communication between the imaging device and the flash unit.

In this conventional technique, the connection between the imaging device and the flash unit is checked by performing a test communication via a communication terminal disposed separately from a flash command terminal for transmitting a flash start command signal. Because the judgment is based on the test on the connection of the communication terminal, if the connection of the communication terminal is good although the connection of the flash start command (FSC) terminal is not good, this technique incorrectly determines that the connection of the FSC terminal is good. If such an incorrect judgment is made, the flash unit does not work when a picture is taken, and under-exposure occurs.

SUMMARY OF THE INVENTION

In view of the above, the present invention provides an imaging device, a flash unit, and a system including an imaging device and a flash unit, having a capability of correctly checking the connection of an FSC terminal between the imaging device and the flash unit.

According to an aspect, the present invention provides an imaging device comprising a flash start command terminal adapted to output a flash start command signal to a flash unit and an output unit adapted to output a terminal connection check signal to the flash unit via the flash start command terminal to determine whether the imaging device and the flash unit are connected to each other via the flash start command terminal in a required connection state. The output unit outputs the terminal connection check signal to the flash unit when a signal indicating that the flash unit has a capability of performing a connection state check using the terminal connection check signal is received.

According to another aspect, the present invention provides a flash unit comprising a flash start command terminal adapted to receive a flash start command signal from an imaging device, a detection unit adapted to detect a terminal connection check signal received from the imaging device via the flash start command terminal, and a connection state evaluation unit adapted to evaluate a terminal connection state such that the connection state evaluation unit determines that the imaging device and the flash unit are connected to each other via the flash start command terminal in a required connection state if the detection unit detects the terminal connection check signal.

According to another aspect, the present invention provides a system including an imaging device and a flash unit. The imaging device comprises an imaging device flash start command terminal disposed on the imaging device and adapted to output a flash start command signal to the flash unit and an output unit adapted to output a terminal connection check signal to the flash unit via the imaging device flash start command terminal. The flash unit comprises a flash unit flash start command terminal disposed on the flash unit and adapted to receive the flash start command signal from the imaging device, a detection unit adapted to detect the terminal connection check signal received from the imaging device via the flash unit flash start command terminal, and a connection state evaluation unit adapted to evaluate a terminal connection state such that the connection state evaluation unit determines that the imaging device and the flash unit are connected to each other via the imaging device flash start command terminal and the flash unit flash start command terminal in a required connection state if the detection unit detects the terminal connection check signal.

According to another aspect, the present invention provides an imaging device comprising a flash start command terminal adapted to output a flash start command signal to a flash unit, a detection unit adapted to detect a terminal connection check signal received from the flash unit via the flash start command terminal, and a connection state evaluation unit adapted to evaluate a terminal connection state such that the connection state evaluation unit determines that the imaging device and the flash unit are connected to each other via the flash start command terminal in a required connection state if the detection unit detects the terminal connection check signal.

According to another aspect, the present invention provides a flash unit comprising a flash start command terminal adapted to receive a flash start command signal from an imaging device, and an output unit adapted to output a terminal connection check signal to the imaging device via the flash start command terminal to determine whether the imaging device and the flash unit are connected to each other via the flash start command terminal in a required connection state.

According to another aspect, the present invention provides a system including an imaging device and a flash unit. The imaging device comprises an imaging device flash start command terminal disposed on the imaging device and adapted to transmit a flash start command signal to the flash unit, a detection unit adapted to detect the terminal connection check signal received from the flash unit via the imaging device flash start command terminal, and a connection state evaluation unit adapted to evaluate a terminal connection state such that the connection state evaluation unit determines that the imaging device and the flash unit are connected to each other via the imaging device flash start command terminal in a required connection state if the detection unit detects the terminal connection check signal. The flash unit comprises a flash unit flash start command terminal disposed on the flash unit and adapted to receive the flash start command signal from the imaging device, and an output unit adapted to output the terminal connection check signal via the flash unit flash start command terminal.

Further features and advantages of the present invention will become apparent from the following description of exemplary embodiments with reference to the attached drawings.

DESCRIPTION OF THE EMBODIMENTS

The present invention is described in further detail below with reference to embodiments in conjunction with the accompanying drawings.

First Embodiment

Figure 1:
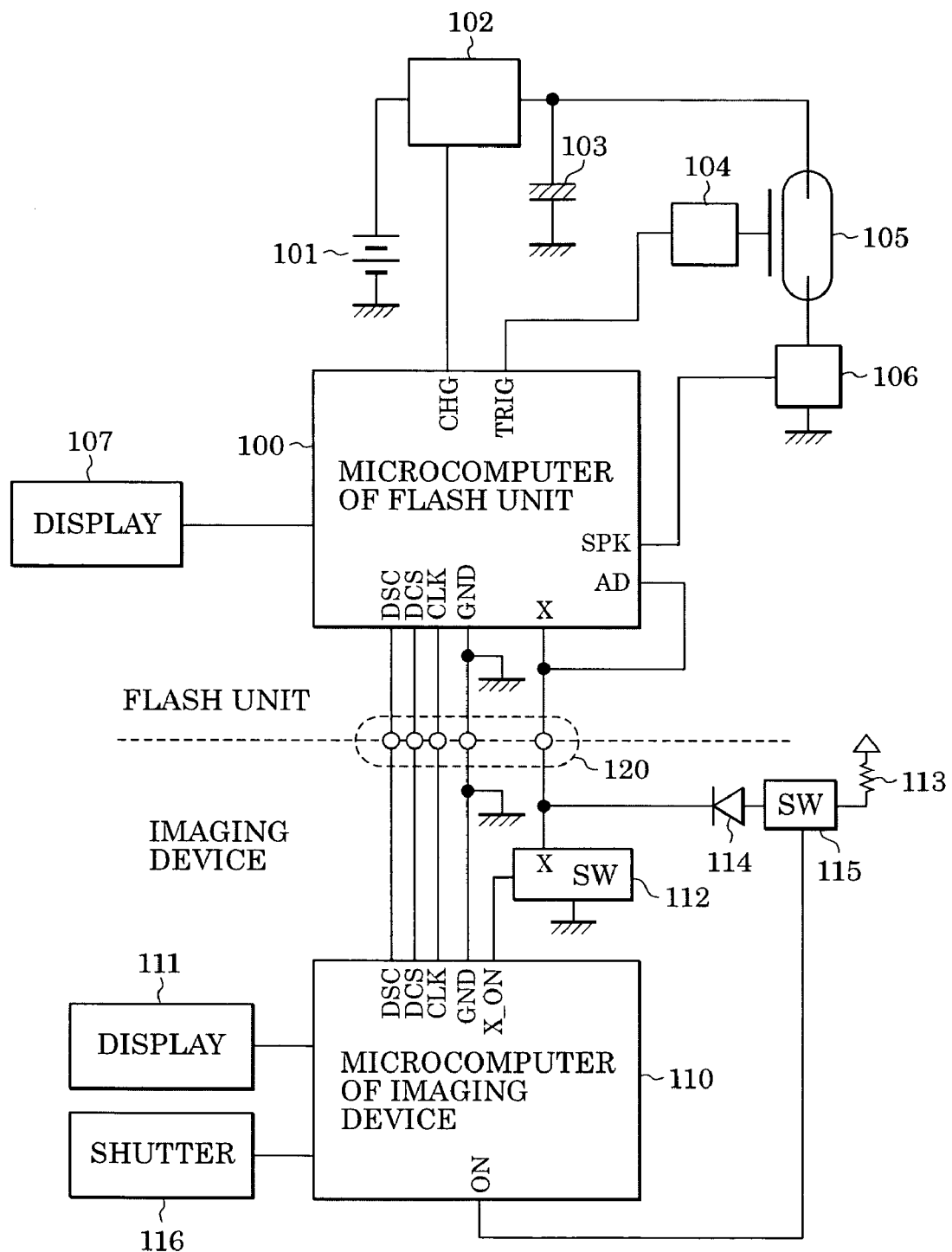
FIG. 1 is a block diagram showing a circuit configuration of an imaging device and a flash unit according to a first embodiment of the present invention.

FIG. 1 is a block diagram showing a circuit configuration of an imaging device, such as a camera or a digital camera, and a flash unit according to a first embodiment of the present invention. First, the structure of the imaging device is described referring to FIG. 1. In FIG. 1, a microcomputer 110 of the imaging device (hereinafter referred to as an ID microcomputer 110) controls the operation of the imaging device and makes various decisions needed in the operation. The imaging device has a display 111 for displaying various kinds of information. When a flash start command (FSC) signal is output from the ID microcomputer 110 via its X_ON terminal to a switching device 112, the switching device 112 outputs an FSC signal to the flash unit. The imaging device and the flash unit are connected to each other via a connection part 120. The connection part 120 includes a CLK terminal for transmission of data communication clock signal from the imaging device to the flash unit, a DCS terminal for transmission of data from the imaging device to the flash unit in synchronization with the clock signal transmitted via the CLK terminal, a DSC terminal for transmission of data from the flash unit to the imaging device in synchronization with the clock signal transmitted via the CLK terminal, a GND terminal for connection of GND (ground) between the imaging device and the flash unit, and an FSC terminal (simply denoted as X in FIG. 1) for transmitting an FSC signal to the flash unit. The FSC terminal is connected to the switching device 112 and to the cathode of a diode 114. An FSC-terminal connection check signal (hereinafter, referred to as an FSCT connection check signal) with a particular voltage is applied to the FSC terminal via a resistor 113, a switching device 115, and the diode 114. The switching device 115 is connected to an ON terminal of the ID microcomputer 110 and is turned on/off by the ID microcomputer 110. A shutter unit 116 is disposed in front of an image sensor in the imaging device. The shutter unit 116 controls light incident on the image sensor by moving a first curtain and a second curtain. If the ID microcomputer 110 detects that the moving first curtain has reached a particular position, the ID microcomputer 110 sets an X-ON terminal to a high level.

Now, the structure of the flash unit is described. A microcomputer 100 of the flash unit (hereinafter referred to as an FU microcomputer 100) controls the operation of the flash unit and makes various decisions needed in the operation. A battery 101 serves as a power source. A step-up circuit 102 produces a voltage as high as several hundred volts from a low voltage supplied from the battery 101. A main capacitor 103 stores electric energy in the form of a high voltage supplied from the step-up circuit 102. A discharge tube 105 converts the electric energy stored in the main capacitor 103 to light. A trigger circuit 104 supplies a high trigger voltage with several thousand volts to cause the discharge tube 105 to start discharge. A discharge control circuit 106 includes a switching device such as an IGBT (Insulated Gate Bipolar Transistor) and controls the discharge of the discharge tube 105. The flash unit also has a display 107.

Of various terminals of the connection part 120 via which the flash unit is connected to the imaging device, an FSC terminal is connected not only to an X terminal of the FU microcomputer 100 but also to an AD terminal connected to an analog-to-digital converter (not shown) disposed in the FU microcomputer 100 such that the voltage of the FSCT connection check signal output from the imaging device and input to the FSC terminal is monitored via the analog-to-digital converter. When the FSC signal is applied from the switching device 112 of the imaging device to the FSC terminal of the FU microcomputer 100, the FU microcomputer 100 controls the trigger circuit 104 to apply the high trigger voltage with the several thousand volts to the discharge tube 105.

When a first stroke (pressing to a halfway position) is applied to a release switch (not shown) of the imaging device, the ID microcomputer 110 executes a routine to check whether the FSC terminal is in a normal connection state. The routine of checking whether the FSC terminal is in the normal connection state is described below with reference to a flow chart shown in FIG. 2.

The ID microcomputer 110 starts the routine from step S101. First, in step S102, the ID microcomputer 110 communicates with the FU microcomputer 100 by using the CLK terminal, the DCS terminal, and the DSC terminal of the connection part 120 via which the imaging device and the flash unit are connected to each other, to determine whether the flash unit has a capability of checking the connection of the FSC terminal. If the flash unit has the capability of checking the connection of the FSC terminal, the process proceeds to step S103. In step S103, the ID microcomputer 110 sets the ON terminal to a high level to turn on the switching device 115 to apply an FSCT connection check signal with a predetermined voltage to the FSC terminal of the flash unit via the diode 114. On the other hand, if it is determined in step S102 that the flash unit does not have the capability of checking the connection of the FSC terminal, the process proceeds to step S104, in which the ID microcomputer 110 sets the ON terminal to a low level to turn off the switch device 115 such that no voltage is applied to the FSC terminal of the flash unit.

In step S105, the ID microcomputer 110 ends the routine of checking the connection of the FSC terminal of the imaging device.

Although in this example, the ID microcomputer 110 starts the routine of checking the connection of the FSC terminal in response to the first stroke of the release switch, the timing of starting the routine is not limited to this. The timing may be selected in various ways. For example, the routine may be started in response to a second stroke (pressing to a second position) on the release switch, or turning-on of the power switch of the imaging device. The routine may also be started when an attachment detection switch detects that the flash unit is attached, or when the imaging device or the flash unit is activated. A device for detecting the connection may be disposed, and the routine may be started in response to an operation of the device.

Figure 3:
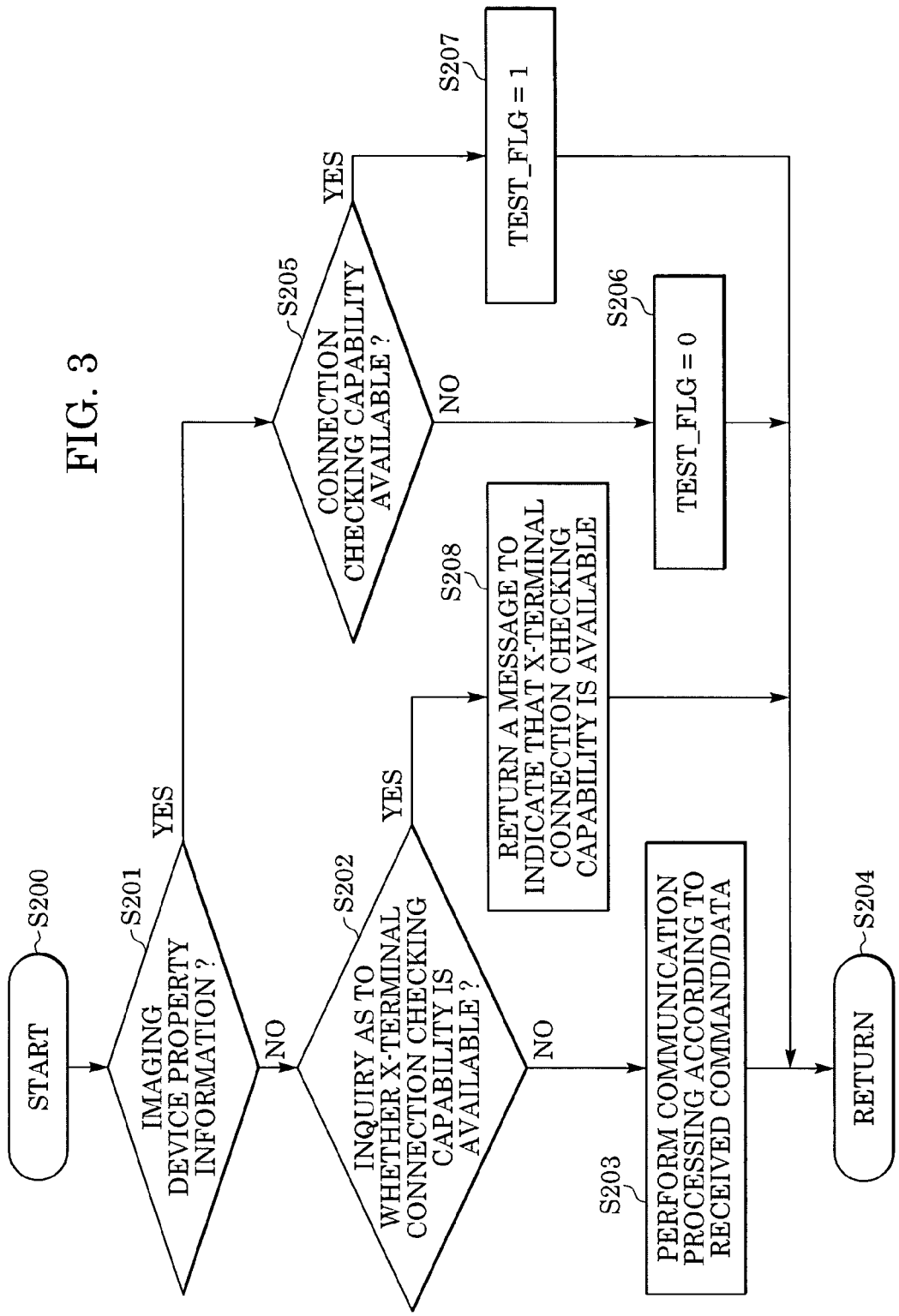
FIG. 3 is a flow chart showing a process performed by the flash unit to check a connection of an FSC terminal according to the first embodiment of the present invention.

A communication process and a process of checking the connection of the FSC terminal performed by the FU microcomputer 100 in the flash unit are described below with reference to a flow chart shown in FIG. 3.

If the FU microcomputer 100 receives one byte of clock signal from the ID microcomputer 110 via the CLK terminal, the FU microcomputer 100 starts a communication interrupt routine from step S200. In step S201, the FU microcomputer 100 determines whether data transmitted from the ID microcomputer 110 is device property data indicating the capability of the imaging device. If not, the process proceeds to step S202. In step S202, the FU microcomputer 100 determines whether the received data is a check command transmitted by the ID microcomputer 110 (in step S102 shown in FIG. 2) to check whether the flash unit has the capability of checking the connection of the FSC terminal. If so, the process proceeds to step S208, but otherwise the process proceeds to step S203.

In the case in which the process proceeds to step S203 because the received data is not the check command to check whether the flash unit has the capability of checking the connection of the FSC terminal, the FU microcomputer 100 performs a communication process according to the received data/command. After the communication process is completed, the process proceeds to step S204, in which the process returns from the communication interrupt routine. In the case in which the received data is determined to be the check command to check whether the flash unit has the capability of checking the connection of the FSC terminal and thus the process proceeds to step S208, the FU microcomputer 100 returns data to the ID microcomputer 110 to inform that the FU microcomputer 100 has the capability of checking the connection of the FSC terminal. After completion of step S208, the process proceeds to step S204, in which the process returns from the communication interrupt routine.

In the case in which the FU microcomputer 100 determines in step S201 that the data received from the ID microcomputer 110 is device property data indicating the capability of the imaging device, the FU microcomputer 100 advances the process to step S205 to determine whether the imaging device has the capability of checking the connection of the FSC terminal. If not, the process proceeds to step S206, in which the FU microcomputer 100 sets TEST_FLG=0 (to indicate that the imaging device does not have the capability of checking the connection of the FSCT terminal). If it is determined in step S205 that the imaging device has the capability of checking the connection of the FSC terminal, the process proceeds to step S207, in which the FU microcomputer 100 sets TEST_FLG=1 (to indicate that the imaging device has the capability of checking the connection of the FSC terminal). In both cases, the process then proceeds to step S204 to return from the communication interrupt routine.

A general process performed by the flash unit under the control of the FU microcomputer 100 is described below with reference to FIG. 4.

When the power switch (not shown) of the flash unit is turned on, the FU microcomputer 100 starts the operation from step S210. In step S211, the FU microcomputer 100 sets a CGH terminal to a high level to activate the step-up circuit 102. In step S212, the FU microcomputer 100 determines whether TEST_FLG=1. If TEST_FLG=1 (that is, if the imaging device has the capability of checking the connection of the FSC terminal), the process proceeds to step S216. If TEST_FLG=0, the process proceeds to step S213, in which the imaging device performs other operations as required. In step S214, the FU microcomputer 100 determines whether the power switch (not shown) is turned off. If so, the process proceeds to step S215, in which the process returns from the routine, but otherwise, the process returns to step S212.

In the case in which the FU microcomputer 100 determines in step S212 that TEST_FLG=1, the FU microcomputer 100 advances the process to step S216 as described above. In step S216, the FU microcomputer 100 converts a voltage received from the imaging device via the AD terminal into digital form. In step S217, the FU microcomputer 100 determines whether the digital data obtained in step S216 has a value equal to or greater than a threshold value, that is, whether the imaging device and the flash unit are connected to each other via the FSC terminal in a required good state and thus the FSCT connection check signal with the predetermined voltage transmitted from the imaging device is correctly received. If the voltage received via the AD terminal is determined to be equal to or greater than the threshold value, it is determined that the imaging device and the flash unit are connected to each other via the FSC terminal in the required good state, and the process proceeds to step S214. However, if the voltage received via the AD terminal is determined to be lower than the threshold value, it is determined that the imaging device and the flash unit are not connected to each other via the FSC terminal in the required good state because of contamination or the like, and the process proceeds to step S218. In step S218, the FU microcomputer 100 displays a warning on the display 107 of the flash unit to notify a user that the FSC terminal is in a failed connection state. The notification may be given, for example, by disabling the indication of completion of fully charging the capacitor of the flash unit or by blinking the indication. Thereafter, the FU microcomputer 100 advances the process to step S214.

Figure 2:
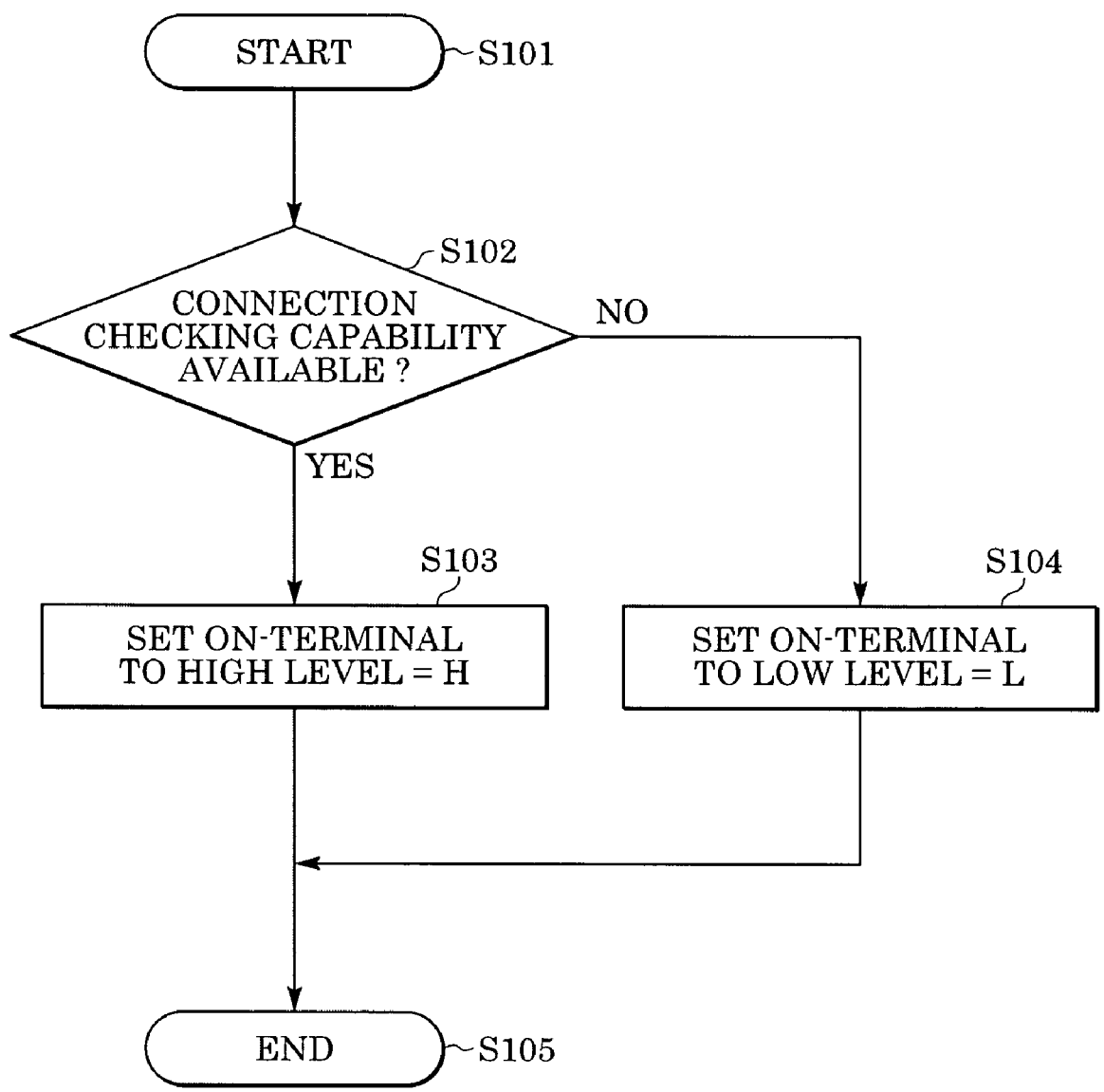
FIG. 2 is a flow chart showing a process performed by the imaging device to check a connection of an FSC terminal according to the first embodiment of the present invention.
Figure 4:
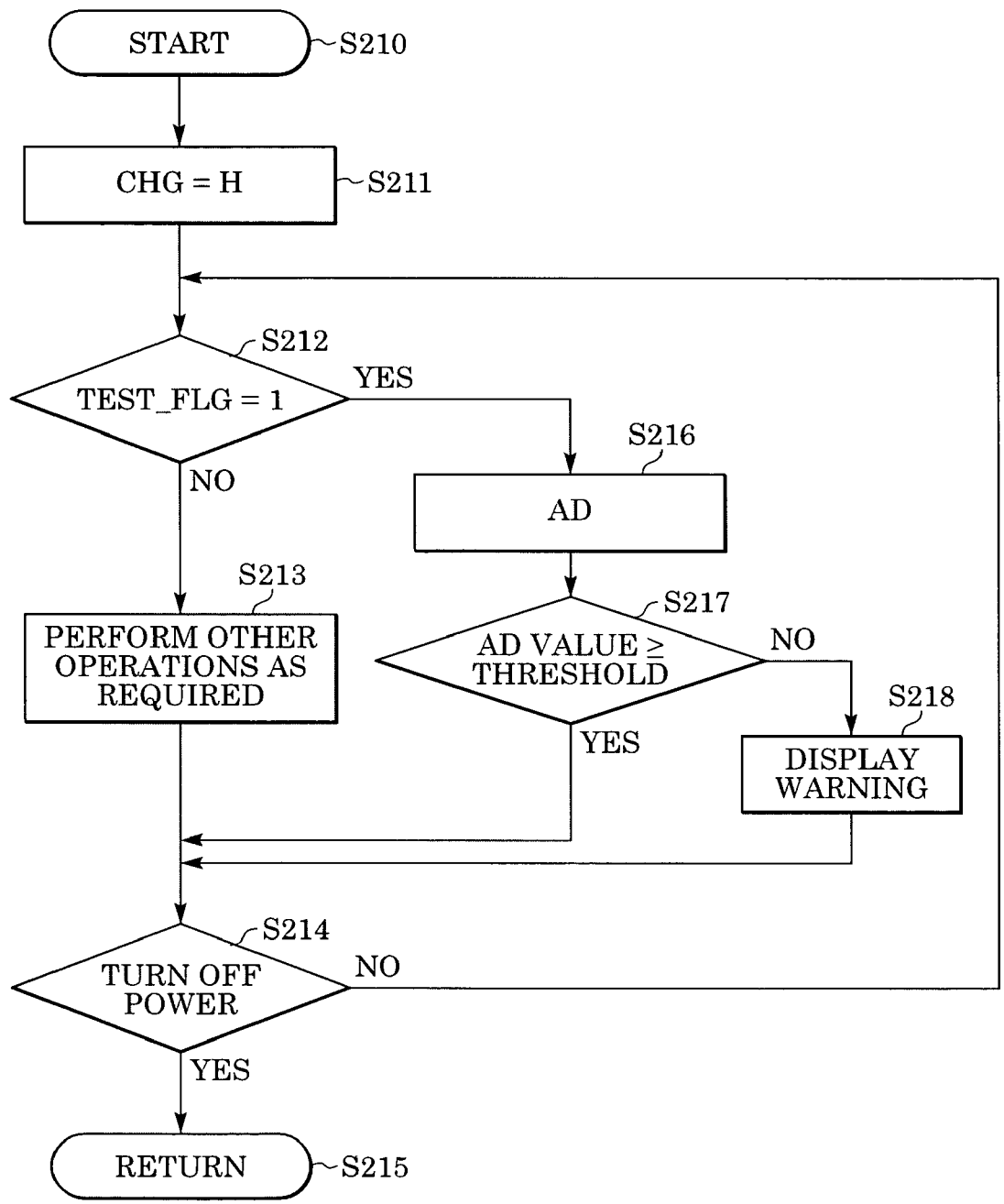
FIG. 4 is a flow chart showing a general process performed by the flash unit according to the first embodiment of the present invention.

In the first embodiment, as described above, the imaging device includes the FSC terminal for transferring the FSC signal to the flash unit, and the device (including the diode 114, the switching device 115, the resistor 113, and parts of the ID microcomputer 110 concerned in the process of step S104 shown in FIG. 2) for generating the FSCT connection check signal with the predetermined voltage, and the flash unit includes the FSC terminal for receiving the FSC signal from the imaging device, the detection device (including the analog-to-digital converter (not shown) disposed in the flash unit and parts of the FU microcomputer 100 concerned in the process of steps S216 and S217 shown in FIG. 4) for detecting the voltage of the FSCT connection check signal applied from the imaging device to the FSC terminal, and the device (including parts of the FU microcomputer 100 concerned in the process of steps S217→S214 or steps S217→S218 shown in FIG. 4) for determining the connection status such that the connection of the FSC terminal between the imaging device and the flash unit is determined to be in the normal state when the voltage of the FSCT connection check signal is detected to be normal by the detection device, and the connection is determined to be in the failed state when the voltage is determined to be abnormal, thus making it possible to check the connection of the FSC terminal between the imaging device and the flash unit without having to perform a light emission test. Thus, it is possible to check not only whether the communication terminal of the connection part 120 is in the normal connection state but also whether the FSC terminal is in the normal connection state.

When the connection of the FSC terminal between the imaging device and the flash unit is in the failed state, a warning is displayed on the display 107 of the flash unit (in step S218 of the routine (shown in FIG. 4) performed by the FU microcomputer 100) to notify the user that the connection is in the failed state.

Second Embodiment

Figure 5:
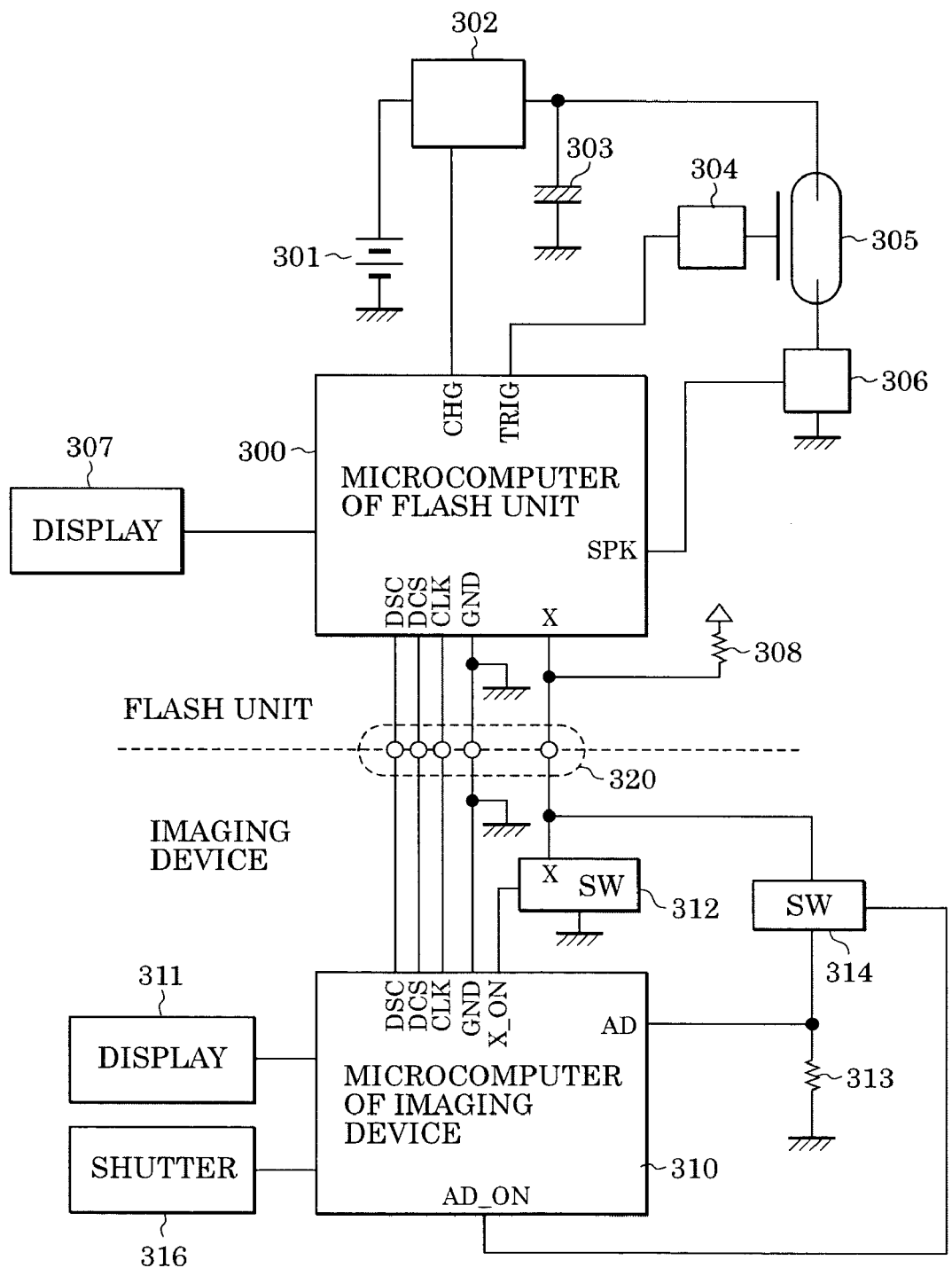
FIG. 5 is a block diagram showing a circuit configuration of an imaging device and a flash unit according to a second embodiment of the present invention.

FIG. 5 is a block diagram showing a circuit configuration of the imaging device and the flash unit according to a second embodiment of the present invention. First, the circuit configuration of the imaging device is described referring to FIG. 5. In FIG. 5, a microcomputer 310 of the imaging device (hereinafter referred to as an ID microcomputer 310) controls the operation of the imaging device and makes various decisions needed in the operation. The imaging device has a display 311 for displaying various kinds of information. When the ID microcomputer 310 sets its X_ON terminal to a high level, a switching device 312 is turned on. As a result, an FSC signal is output to the flash unit. The imaging device and the flash unit are connected to each other via a connection part 320. The connection part 320 includes a CLK terminal for transmission of data communication clock signal from the imaging device to the flash unit, a DCS terminal for transmission of data from the imaging device to the flash unit in synchronization with the clock signal transmitted via the CLK terminal, a DSC terminal for transmission of data from the flash unit to the imaging device in synchronization with the clock signal transmitted via the CLK terminal, a GND terminal for connection of GND between the imaging device and the flash unit, and an FSC terminal for transmitting an FSC signal to the flash unit. The FSC terminal is connected to an AD terminal of the ID microcomputer 310 via the switching device 314. The AD terminal is connected to an analog-to-digital converter disposed in the ID microcomputer 310, although not shown in FIG. 5. The switching device 314 is connected to an AD_ON terminal of the ID microcomputer 310 and is turned on/off by the ID microcomputer 310. A resistor 313 is connected to the AD terminal of the ID microcomputer 310. A shutter unit 316 is disposed in front of an image sensor in the imaging device. The shutter unit 116 controls light incident on the image sensor by moving a first curtain and a second curtain. If the ID microcomputer 310 detects that the moving first curtain has reached a particular position, the ID microcomputer 310 sets the X-ON terminal to a high level.

Now, the structure of the flash unit is described. A microcomputer 300 of the flash unit (hereinafter referred to as an FU microcomputer 300) controls the operation of the flash unit and makes various decisions needed in the operation. A battery 301 serves as a power source. A step-up circuit 302 produces a voltage as high as several hundred volts from a low voltage supplied from the battery 301. A main capacitor 303 stores electric energy in the form of a high voltage supplied from the step-up circuit 302. A discharge tube 305 converts the electric energy stored in the main capacitor 303 to light. A trigger circuit 304 supplies a high trigger voltage with several thousand volts to cause the discharge tube 305 to start discharge. A discharge control circuit 306 includes a switching device such as an IGBT and controls the discharge of the discharge tube 305. The flash unit also has a display 307.

An X terminal of the FU microcomputer 300 is connected not only to the part of the connection part 320 via which the flash unit is connected to the imaging device but also connected via a resistor 308 to a power supply line with a voltage lower than the FSC signal output from the switching device 312 such that a voltage applied to the X terminal of the FU microcomputer 300 via the resistor 308 serves as an FSCT connection check signal transmitted from the flash unit to the imaging device. Except for the above, the flash unit is similar in function and structure to the flash unit according to the first embodiment (FIG. 1), and thus a duplicated description is not given herein.

When a first stroke is applied to a release switch (not shown) of the imaging device, the ID microcomputer 310 executes a routine to check whether the FSC terminal is in a normal connection state. The routine of checking whether the FSC terminal is in the normal connection state is described below with reference to a flow chart shown in FIG. 6.

The ID microcomputer 310 starts the routine from step S301. First, in step S302, the ID microcomputer 310 communicates with the FU microcomputer 300 by using the CLK terminal, the DCS terminal, and the DSC terminal of the connection part 320 via which the imaging device and the flash unit are connected to each other, to determine whether the flash unit has a capability of checking the connection of the FSC terminal. If the flash unit does not have the capability of checking the connection of the FSC terminal, the process proceeds to step S303, in which the ID microcomputer 310 sets the AD_ON terminal to the low level to turn off the switching device 314. Thereafter, the process proceeds to step S304, in which the process exits the routine of checking the connection of the FSC terminal of the imaging device.

On the other hand, if it is determined in step S302 that the flash unit has the capability of checking the connection of the FSC terminal, the process proceeds to step S305, in which the ID microcomputer 310 sets the AD_ON terminal to the high level to turn on the switching device 314. In step 306, the voltage of the FSCT connection check signal generated by the flash unit and applied to the AD terminal via the FSC terminal of the connection part 320 between the imaging device and the flash unit and further via the switching device 314 is measured by converting the voltage into digital form.

In step S307, the ID microcomputer 310 determines, based on the result of the analog-to-digital conversion, whether the voltage of the received FSCT connection check signal is equal to or higher than a threshold value. If the voltage is equal to or higher than the threshold value, it is determined that the connection of the FSC terminal between the imaging device and the flash unit is in the normal state. In this case, the process proceeds to step S308. However, in the case it is determined in step S307 the voltage is lower than the threshold value, it is determined that the connection of the FSC terminal between the imaging device and the flash unit is in a failed state, and the process proceeds to step S309. In step S309, the ID microcomputer 310 displays a warning on the display 311 to notify a user that the connection of the FSC terminal between the imaging device and the flash unit is in the failed state. The notification may be given, for example, by disabling the indication of completion of fully charging the capacitor of the flash unit or by blinking the indication. In step S308, the ID microcomputer 310 sets the AD_ON terminal to the low level to turn off the switching device 314. The process then proceeds to step S310, in which the ID microcomputer 310 ends the routine performed by the imaging device to check the connection of the FSC terminal.

Although in this example, the ID microcomputer 310 starts the routine of checking the connection of the FSC terminal in response to the first stroke of the release switch, the timing of starting the routine is not limited to this. The timing may be selected in various ways. For example, the routine may be started in response to a second stroke (pressing to a second position) on the release switch, or turning-on of the power switch of the imaging device. The routine may also be started when an attachment detection switch detects that the flash unit is attached, or when the imaging device or the flash unit is activated. A device for detecting the connection may be disposed, and the routine may be started in response to an operation of the device.

Figure 6:
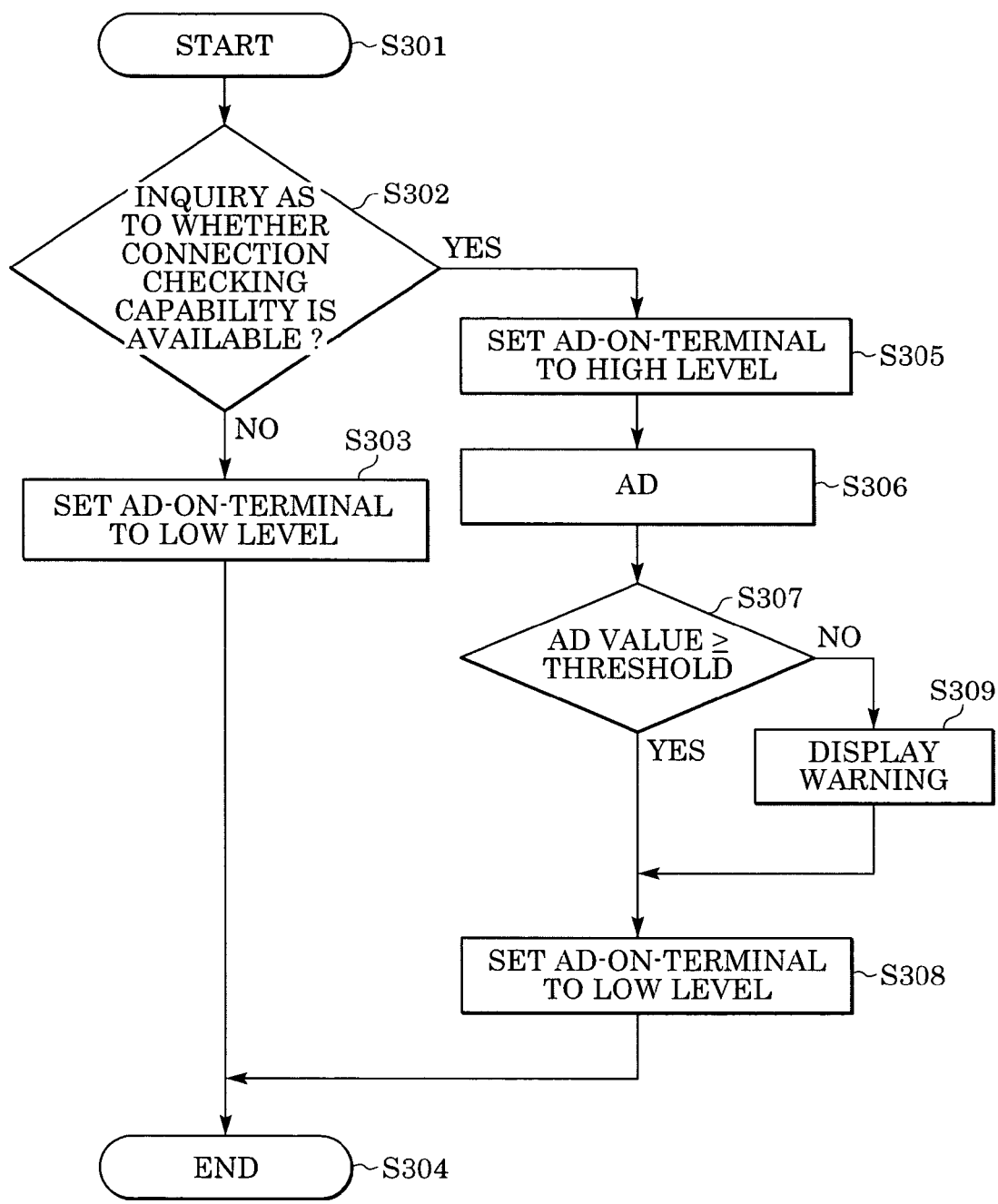
FIG. 6 is a flow chart showing a process performed by the imaging device to check a connection of an FSC terminal according to the second embodiment of the present invention.

In the second embodiment, as described above, the flash unit includes the FSC terminal for receiving the FSC signal supplied from the imaging device and the device (the resistor 308) for applying the FSCT connection check signal with the predetermined voltage to the FSC terminal, and the imaging device includes the FSC terminal for transferring the FSC signal to the flash unit, the detection device (including the switching device 314, the resistor 313, and parts of the ID microcomputer 310 concerned in the process of steps S305 and S306 shown in FIG. 6) for detecting the voltage of the FSCT connection check signal applied from the flash unit to the FSC terminal, and the device (including parts of the ID microcomputer 310 concerned in the process of steps S307→S308 or steps S307→S309 shown in FIG. 6) for determining the connection status such that the connection of the FSC terminal between the imaging device and the flash unit is determined to be in the normal state when the voltage of the FSCT connection check signal is detected to be normal by the detection device, and the connection is determined to be in the failed state when the voltage is determined to be abnormal, thus making it possible to check the connection of the FSC terminal between the imaging device and the flash unit without having to perform a light emission test.

When the connection of the FSC terminal between the imaging device and the flash unit is in the failed state, a warning is displayed on the display 311 of the display 311 (in step S309 of the routine (shown in FIG. 6) performed by the ID microcomputer 310) to notify the user that the connection is in the failed state.

In the second embodiment, because the switching device 314 is turned on only if the flash unit attached to the imaging device has the capability of checking the connection of the FSC terminal, even when the flash unit attached to the imaging device is of the type that supplies a high voltage to the FSC terminal between the imaging device and the flash unit, a high voltage is never applied to the AD terminal of the ID microcomputer. This protects the ID microcomputer 310. Hereinafter, a flash unit of the type that outputs a high voltage will referred to as a high-voltage flash unit.

Third Embodiment

Figure 7:
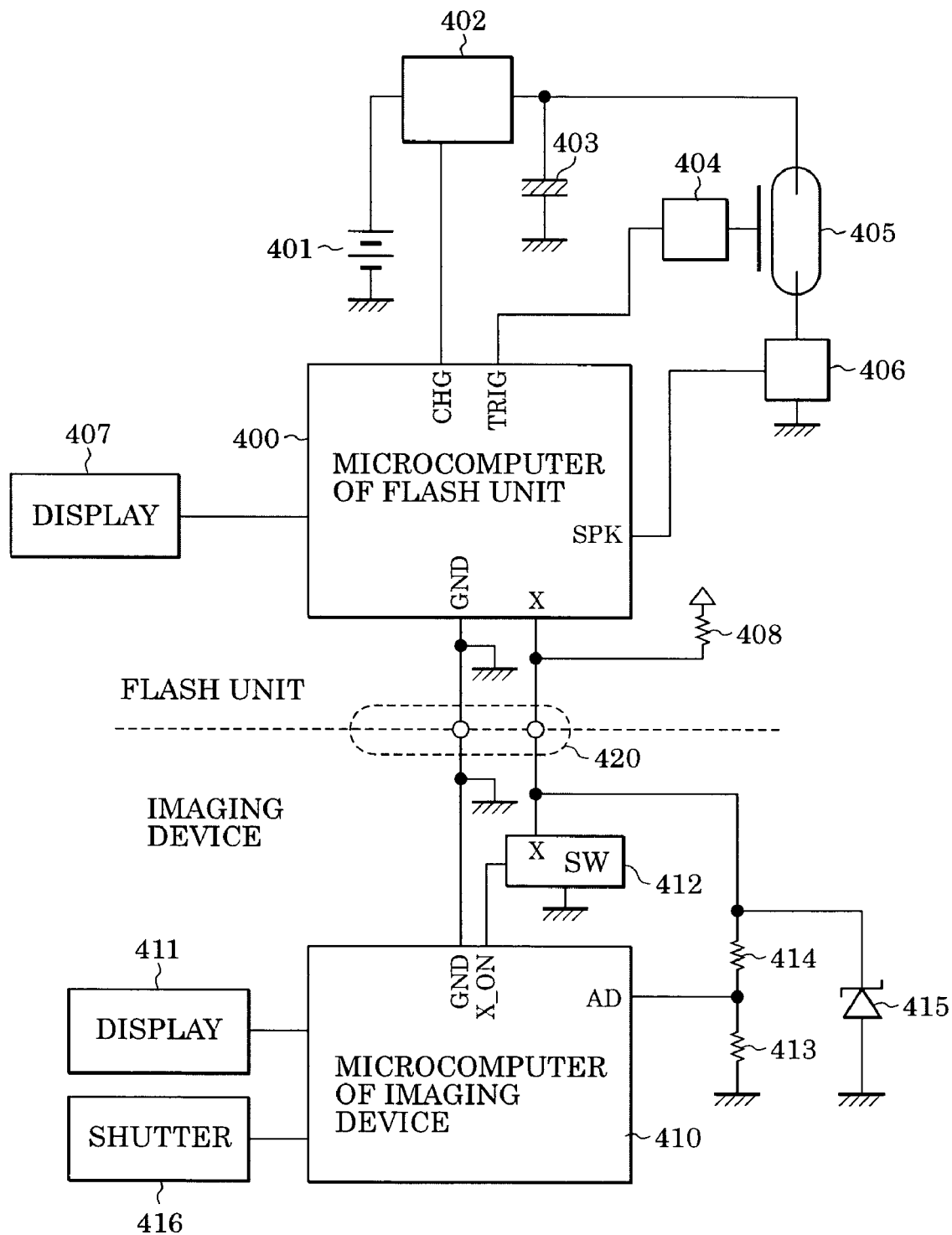
FIG. 7 is a block diagram showing a circuit configuration of an imaging device and a flash unit according to a third embodiment of the present invention.

FIG. 7 is a block diagram showing a circuit configuration of an imaging device and a flash unit according to a third embodiment of the present invention. First, the structure of the imaging device is described referring to FIG. 7. In FIG. 7, an ID microcomputer 410, a display 411, and a switching device 412 are similar to corresponding parts according to the first or second embodiment described above. The imaging device and the flash unit are connected to each other via a connection part 420. The connection part 420 includes a GND terminal for connection of GND between the imaging device and the flash unit, and an FSC terminal for transferring an FSC signal to the flash unit from the imaging device. A series of a resistor 413 and a resistor 414 is connected between the FSC terminal and GND, and the node between the resistors 413 and 414 is connected to an AD terminal of the ID microcomputer 410. A Zener diode 415 is connected between the FSC terminal and GND. A shutter unit 416 is disposed in front of an image sensor in the imaging device. The shutter unit 416 controls light incident on the image sensor by moving a first curtain and a second curtain. If the ID microcomputer 410 detects that the moving first curtain has reached a particular position, the ID microcomputer 410 sets an X-ON terminal to a high level.

When the flash unit attached to the imaging device is of the high-voltage type, a high voltage (several hundred volts) is applied to the FSC terminal of the connection part 420 via which the imaging device and the flash unit is connected to each other. Even when such a high voltage is applied to the FSC terminal, the provision of the Zener diode 415 ensures that the voltage applied to the AD terminal of the ID microcomputer 410 cannot be greater than a predetermined value. That is, even when the ID microcomputer 410 is of the type that cannot handle a high voltage, the Zener diode 415 prevents the AD terminal from being subjected to a high voltage that would destroy the ID microcomputer 410.

Now, the structure of the flash unit is described. A microcomputer 400 of the flash unit (hereinafter referred to as an FU microcomputer 400) controls the operation of the flash unit and makes various decisions needed in the operation. A battery 401 serves as a power source. A step-up circuit 402 produces a voltage as high as several hundred volts from a low voltage supplied from the battery 401. A main capacitor 403 stores electric energy in the form of a high voltage supplied from the step-up circuit 402. A discharge tube 405 converts the electric energy stored in the main capacitor 403 to light. A trigger circuit 404 supplies a high trigger voltage with several thousand volts to cause the discharge tube 405 to start discharge. A discharge control circuit 406 includes a switching device such as an IGBT and controls the discharge of the discharge tube 405. The flash unit also has a display 407.

An X terminal of the FU microcomputer 400 is connected not only to the FSC terminal of the connection part via which the flash unit is connected to the imaging device but is also connected via a resistor 408 to a power supply line with a voltage lower than the FSC signal output from the switching device 412 such that a voltage applied to the X terminal of the FU microcomputer 400 via the resistor 408 serves as an FSCT connection check signal transmitted from the flash unit to the imaging device. Except for the above, the flash unit is similar in function and structure to the flash unit according to the second embodiment (FIG. 5), and thus a duplicated description is not given herein.

When a first stroke (pressing to a halfway position) is applied to a release switch (not shown) of the imaging device, the ID microcomputer 410 executes a routine to check whether the FSC terminal is a normal connection state. The routine of checking whether the FSC terminal is in the normal connection state is described below with reference to a flow chart shown in FIG. 8.

The ID microcomputer 410 starts the routine from step S401. First, in step S402, the ID microcomputer 410 determines a voltage of the AD terminal connected to the node between the resistor 413 and the resistor 414 by converting the voltage applied to the AD terminal into digital form, thus detecting the voltage of the FSCT connection check signal applied to the FSC terminal between the imaging device and the flash unit via the resistor 408. In step S403, the FU microcomputer 400 determines based on the result of the analog-to-digital conversion, whether the voltage applied to the AD terminal is equal to or higher than a first threshold value, thus determining whether the connection of the FSC terminal between the imaging device and the flash unit is in the normal state. If the connection is in the normal state, the process proceeds to step S404. However, in the case in which it is determined that the voltage is lower than the first threshold voltage, the ID microcomputer 410 determines that the connection of the FSC terminal between the imaging device and the flash unit is in a failed state. In this case, the process proceeds to step S406, and ID microcomputer 410 displays a warning on the display 411 to notify a user that the connection is in the failed state. Thereafter, the process proceeds to step S405. The notification may be given, for example, by disabling the indication of completion of fully charging the capacitor of the flash unit or by blinking the indication.

In the case in which the process proceeds to step S404 after it is determined in step S403 that the connection of the FSC terminal between the imaging device and the flash unit is in the normal state, the ID microcomputer 410 determines, based on the above-described result of the analog-to-digital conversion, whether the voltage applied to the AD terminal is equal to or higher than a second threshold value (which is greater than the first threshold value) to determine whether the flash unit is of the high voltage type that supplies a voltage as high as several hundred volts to the FSC terminal. If so, the process proceeds to step S407, but otherwise (if the voltage is lower than the second threshold value) the process proceeds to step S405. In step S407, the ID microcomputer 410 displays a warning on the display 411 to notify a user that a high voltage flash unit is connected. Thereafter, the process proceeds to step S405.

In step S405, the ID microcomputer 410 ends the routine performed by the imaging device to check the connection of the FSC terminal.

Although in this example, the ID microcomputer 410 starts the routine of checking the connection of the FSC terminal in response to the first stroke of the release switch, the timing of starting the routine is not limited to this. The timing may be selected in various ways. For example, the routine may be started in response to a second stroke (pressing to a second position) on the release switch, or turning-on of the power switch of the imaging device. The routine may also be started when an attachment detection switch detects that the flash unit is attached, or when the imaging device or the flash unit is activated. A device for detecting the connection may be disposed, and the routine may be started in response to an operation of the device.

Figure 8:
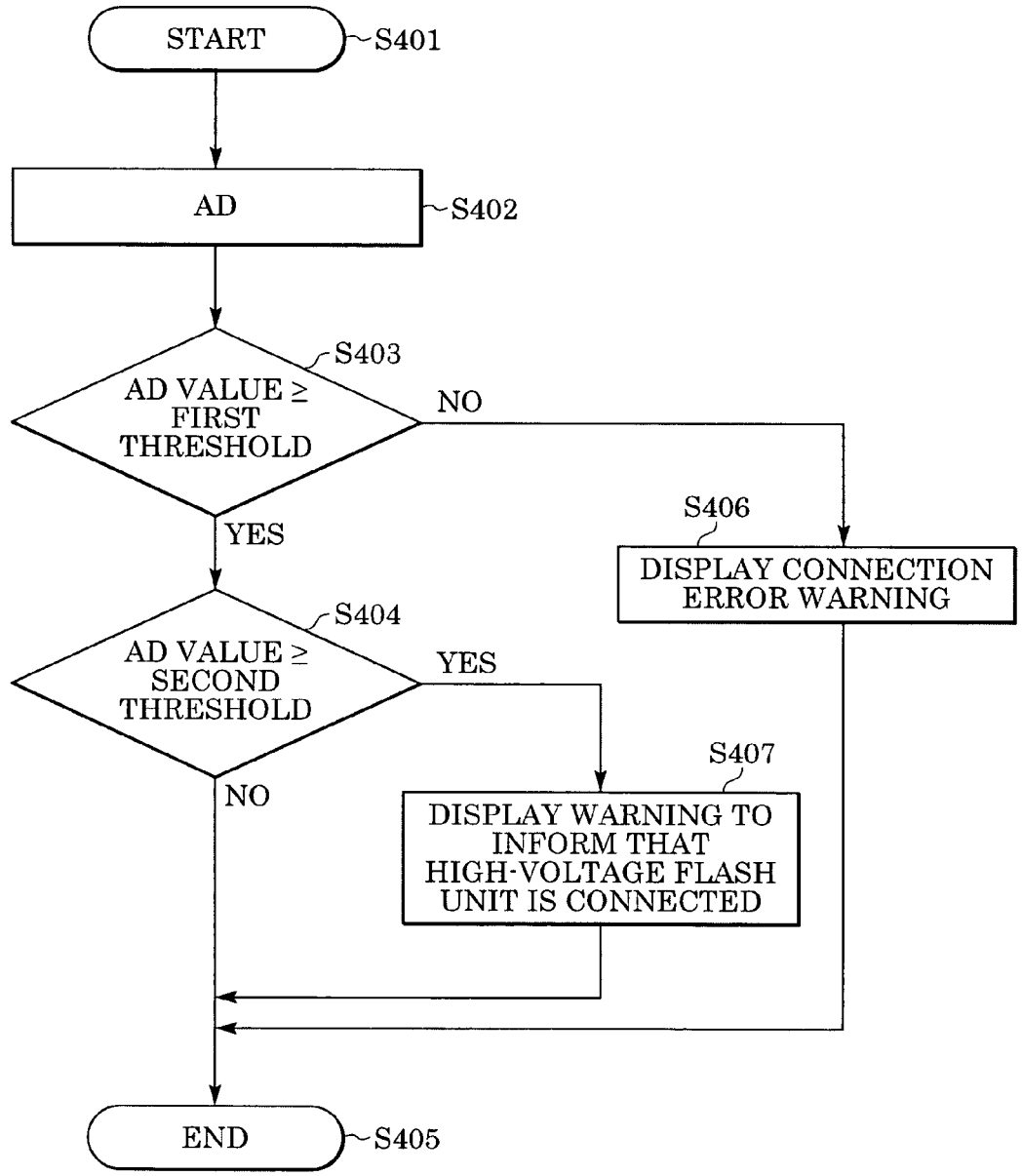
FIG. 8 is a flow chart showing a process performed by the imaging device to check a connection of an FSC terminal according to the third embodiment of the present invention.

In the third embodiment, as described above, the flash unit includes the FSC terminal for receiving the FSC signal supplied from the imaging device and the device (the resistor 408) for applying the FSCT connection check signal with the predetermined voltage to the FSC terminal, and the imaging device includes the FSC terminal for transferring the FSC signal to the flash unit, the detection device (including the resistors 413 and 414, and parts of the ID microcomputer 410 concerned in the process of step S402 shown in FIG. 8) for detecting the voltage of the FSCT connection check signal applied from the flash unit to the FSC terminal, and the device (including parts of the ID microcomputer 410 concerned in the process of steps S403→S406 or steps S403→S404 shown in FIG. 8) for determining the connection status such that the connection of the FSC terminal between the imaging device and the flash unit is determined to be in the normal state when the detection device detects the FSCT connection check signal, and the connection is determined to be in the failed state when the FSCT connection check signal is not detected, thus making it possible to check the connection of the FSC terminal between the imaging device and the flash unit without having to perform a light emission test.

When the connection of the FSC terminal between the imaging device and the flash unit is in a failed state, a warning is displayed on the display 311 of the display 311 (in step S406 of the routine (shown in FIG. 8) performed by the ID microcomputer 410) to notify the user that the connection is in the failed state.

Even when the flash unit attached to the imaging device is of the high voltage type and thus a voltage as high as several hundred volts is applied to the FSC terminal (in this case, the result of step S404 shown in FIG. 8 is yes), the provision of the Zener diode 415 protects the ID microcomputer 410 from being subjected to the high voltage. When such a high-voltage flash unit is attached, a warning may be displayed (on the display 411 in step S407 shown in FIG. 8) to inform a user that the flash unit attached is of the high voltage type. By properly selecting parameters associated with the resistors 413 and 414 and the Zener diode 415, it is possible to adapt the imaging device to a flash unit of a middle voltage type that supplies a voltage of several ten volts to the FSC terminal.

Furthermore, a program for performing the actions described herein may be supplied to a system or apparatus.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-412653 filed Dec. 11, 2003, which is hereby incorporated by reference herein.

What is claimed is:

1. An imaging device comprising:
   a flash start command terminal adapted to output a flash start command signal to a flash unit;
   an output unit adapted to output a terminal connection check signal to the flash unit via the flash start command terminal to determine whether the imaging device and the flash unit are connected to each other via the flash start command terminal in a required connection state; and
   a transfer terminal adapted to receive, from the flash unit, a connection check performable signal indicating that the flash unit has the capability of performing a connection state check using the terminal connection check signal,
   wherein the output unit outputs the terminal connection check signal to the flash unit when the connection check performable signal is received.

2. A flash unit connectable to an imaging device, comprising:
   a flash start command terminal adapted to receive a flash start command signal from the imaging device;
   a detection unit adapted to detect a terminal connection check signal received from the imaging device via the flash start command terminal;
   a transfer terminal adapted to output, to the imaging device, a connection check performable signal indicating that the flash unit has a capability of performing a connection state check using the terminal connection check signal; and
   a connection state evaluation unit adapted to evaluate a terminal connection state such that the connection state evaluation unit determines that the imaging device and the flash unit are connected to each other via the flash start command terminal in a required connection state if the detection unit detects the terminal connection check signal after the flash unit outputs the connection check performable signal via the transfer terminal.

3. A flash unit according to claim 2, further comprising a warning unit adapted to issue a warning when the connection state evaluation unit determines that connection between the imaging device and the flash unit via the flash start command terminal does not satisfy the required connection state.

4. A system including an imaging device and a flash unit, the system comprising:
   the imaging device comprising:
      an imaging device flash start command terminal disposed on the imaging device and adapted to output a flash start command signal to the flash unit;
      an output unit adapted to output a terminal connection check signal to the flash unit via the imaging device flash start command terminal; and
      an imaging device transfer terminal adapted to receive, from the flash unit, a connection check performable signal indicating that the flash unit has a capability of performing the connection state check using the terminal connection check signal, and
   the flash unit comprising:
      a flash unit flash start command terminal disposed on the flash unit and adapted to receive the flash start command signal from the imaging device;
      a detection unit adapted to detect the terminal connection check signal received from the imaging device via the flash unit flash start command terminal;
      a flash unit transfer terminal adapted to output the connection check performable signal to the imaging device; and
      a connection state evaluation unit adapted to evaluate a terminal connection state such that the connection state evaluation unit determines that the imaging device and the flash unit are connected to each other via the imaging device flash start command terminal and the flash unit flash start command terminal in a required connection state if the detection unit detects the terminal connection check signal,
   wherein the imaging device outputs the terminal connection check signal to the flash unit when the imaging device receives the connection check performable signal.

5. A system according to claim 4, further comprising a warning unit adapted to issue a warning when the connection state evaluation unit determines that connection between the imaging device and the flash unit via the imaging device flash start command terminal and the flash unit flash start command terminal does not satisfy the required connection state.

* * * * *